Inventor
F.J.L.Turner-R.G.Moore
By [signature]
Attorney

*Inventor*
F.J.L.Turner-R.G.Moore
By Robert Harding
*Attorney*

*Inventor*
F.J.L.Turner-R.G.Moore
*By* Robert Harding Jr.
*Attorney*

*Inventor*
F.J.L.Turner-R.G.Moore
*By* Robert Harding Jr
*Attorney*

3,187,165
TAPE STORAGE DEVICES

Frederick James Leslie Turner and Royston Geoffrey Moore, Croydon, England, assignors to Creed & Company Limited, Croydon, England, a British company Filed Mar. 18, 1960, Ser. No. 15,943
Claims priority, application Great Britain, Apr. 10, 1959, 12,219/59
2 Claims. (Cl. 235—61.11)

This invention relates to tape storage devices.

Tape is a very suitable medium on which to store information. It is frequently convenient to provide a tape which is divided into sections, these sections being arranged in sequence along the length of the tape and each one being allocated to a given purpose. Tape may then be fed from one reel to another until a particular desired section is reached and then this section may be utilized by either taking information from or imparting information to the tape.

In previous arrangements for winding tape from one reel to another, somewhat complicated apparatus has very often been provided for sensing the diameter of the tape on each reel and controlling the speeds of rotation of the reels to ensure that tape is fed from one reel at the same rate as it is fed to the other reel.

The present invention provides an arrangement by which access to a particular derived section of the tape may be obtained easily. In the preferred embodiment of the invention which will be described this access is obtained comparatively quickly and using apparatus which is simple.

A preferred embodiment of the present invention will now be described with reference to the accompanying drawings, in which.

Figure 2:
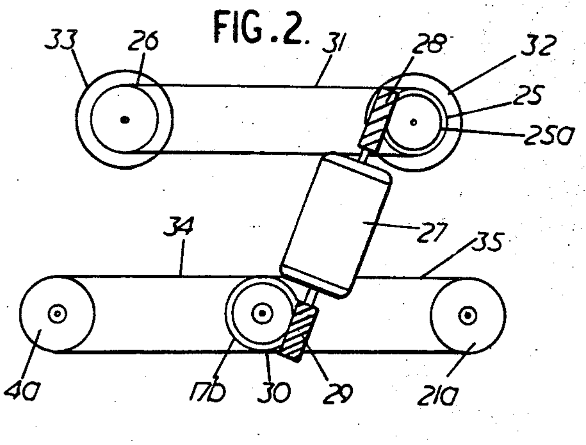
FIG. 2 is a diagrammatic view of part of the drive mechanism of the tape store shown in FIG. 1.
Figure 2A:
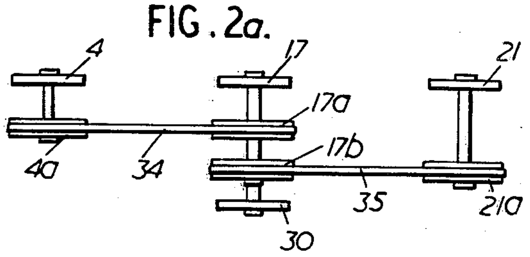
Figure 8:
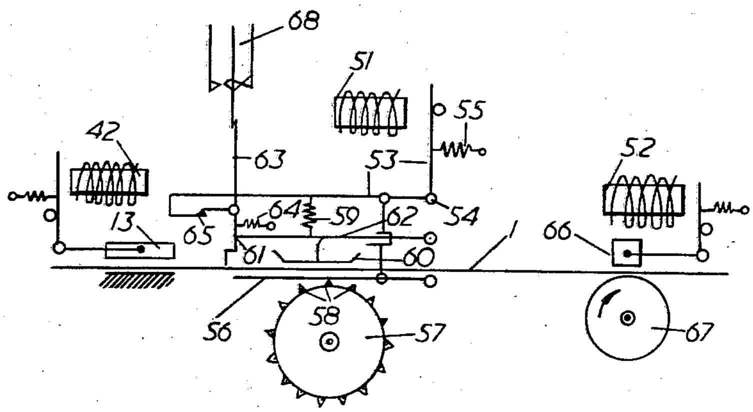
Figure 7:
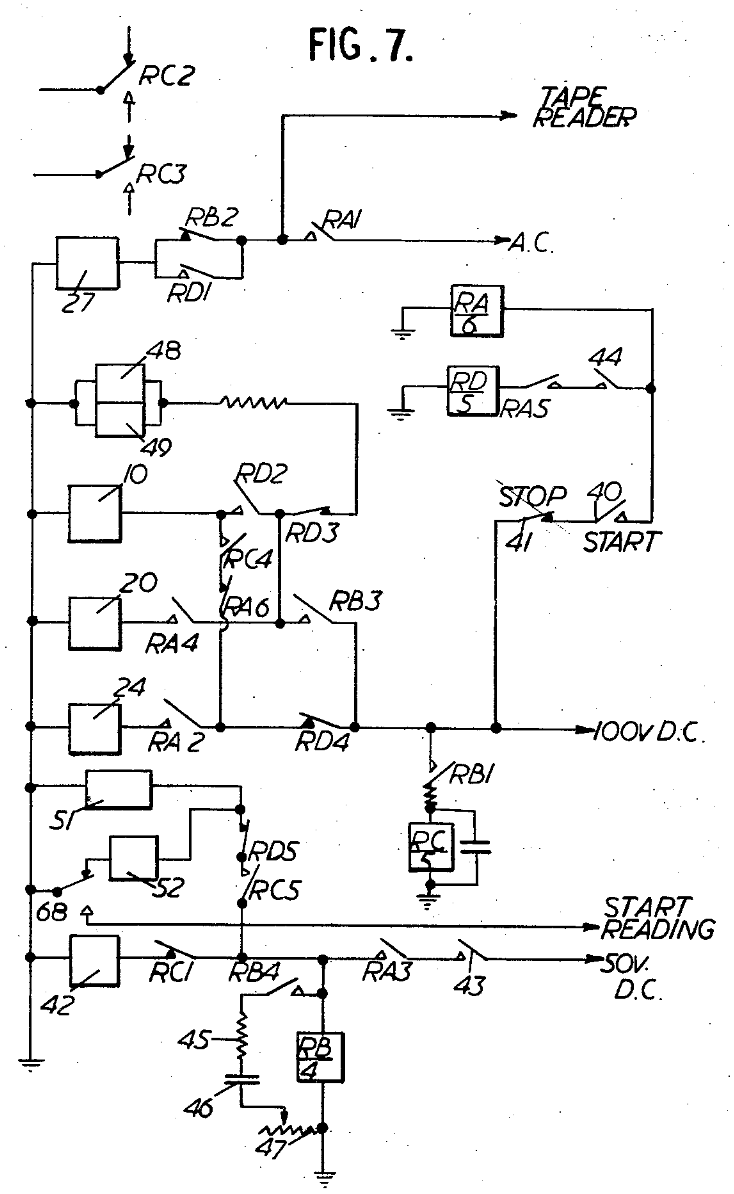

FIG. 2*a* is a plan view of the driving mechanism shown in the lower part of FIG. 2;

FIGS. 3, 4, 5 and 6 are diagrammatic views of the tape store, drawn to a reduced scale, showing the store at various stages of operation;

FIG. 7 illustrates the electrical circuit employed in the operation of the device;

FIG. 8 shows diagrammatically part of the associated tape reader; and

Figure 9:
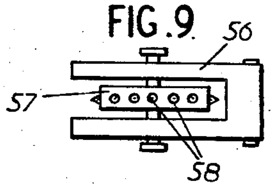

FIG. 9 shows a plan view of part of FIG. 8.

Figure 1:
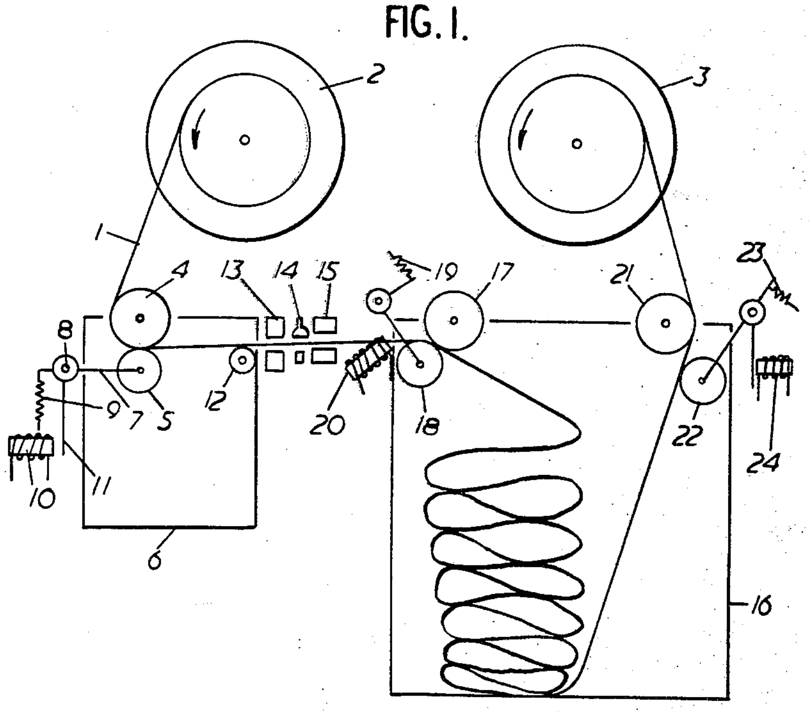
FIG. 1 is a diagrammatic view of a tape store according to our invention.

In the storage device shown in FIG. 1 punched tape 1 is being fed from a reel 2 to a reel 3. The tape from the reel 2 is fed between rollers 4 and 5 positioned in a tape magazine 6. The roller 4 is driven in a manner to be described with reference to FIG. 2, and the roller 5 is rotatably mounted on an arm 7 pivoted about a point 8. A spring 9 maintains the roller 5 against the roller 4 except when an electromagnet 10 is energised, and attracts another arm 11 rotatable about the pivot point 8 and fixed to the arm 7.

The tape then passes over a roller 12 and out of the magazine 6, between the two clamping members of a brake 13, past a photo-electric reader 14, past a read-out head 15, and into another magazine 16. The tape is guided into the magazine 16 by two rollers 17 and 18, the roller 17 being driven in the same manner as the roller 4. The roller 18 is controlled in a manner similar to the roller 5 with a spring 19 for urging the rollers 17 and 18 together and with an electromagnet 20 for moving them apart.

The width of the magazines 6 and 16 is slightly larger than the width of the tape so that tape which accumulates in one or both of the magazines will form in the overlapping manner shown in the FIGS. 1, 3, 4, 5 and 6. It will be noticed that the tape capacity of the magazine 6 is much smaller than that of the magazine 16. The reason for this will be apparent from the detailed description of the operation of this embodiment which will be made later with reference to FIGS. 3 to 7.

From the magazine 16 the tape 1 passes between two separated rollers 21 and 22 to the reel 3. Of these two rollers 21 and 22, the roller 21 is driven while the roller 22 is controlled in a manner similar to the rollers 5 and 18 by a spring 23 and an electromagnet 24. FIG. 1 shows tape being fed from the reel 2 to the reel 3 with the roller 22 moved away from the roller 21 by energisation of the electromagnet 24.

FIGS. 2 and 2*a* illustrate the method of driving the reels 2 and 3, and the rollers 4, 17 and 21, the reels 2 and 3, which are not shown on either of these figures being mounted on the same axes as the pulleys 26 and 25 respectively. A motor 27 has drive gears 28, 29, one at each end of the shaft, and these drive gears engage with associated gears 25*a* and 30 thereby directly driving the pulley 25 and reel 3, and the roller 17 and the pulleys 17*a* and 17*b* respectively. A non-slip driving belt 31 is connected between the pulley 25 and the pulley 26 so that the reels 2 and 3 are rotated at the same angular speed. Electromagnetic friction brakes 32 and 33 are mounted adjacent the gears 25 and 26 respectively for stopping the reels 2 and 3. The motor 27 could alternatively be provided with a brake but it is preferable to brake the reels. The pulleys 17*a* and 17*b* respectively are connected by non-slip driving belts 34, 35 to drive the pulleys 4*a* and 21*a* and therefore the rollers 4 and 21 at the same speed as the roller 17.

In one particular embodiment of the present invention, the reels 2 and 3 have an inner diameter of 12 inches and when either one of them is loaded with 1000 feet of tape the outer diameter of the tape is approximately 14.4 inches. The diameters of the rollers 4, 17 and 21 is 3 inches.

The gearing on the shaft of the motor 27 is calculated to drive the rollers 4, 17 and 21 at an angular speed 5.2 times that of the reels 2 and 3. In theory a speed ratio of 4.8:1 is all that is required, but in practice a certain amount of slip occurs between the rollers and the tape and it is necessary to have the peripheral velocities of the rollers 4, 17, 21 greater than the tape velocity.

Figure 3:
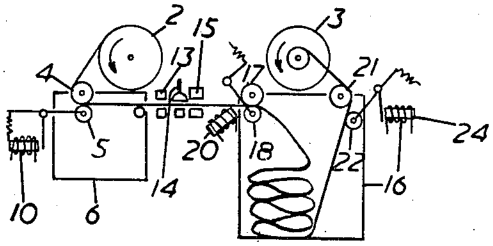

The tape has a plurality of sections each one of which is allocated to a given purpose such as containing specific information, and FIG. 3 shows the tape store with the tape 1 being fed from the reel 2 to the reel 3 in order to find a particular section of the tape. It is preferred that the required section of the tape should be reached without delay and this is achieved by feeding the tape at a high speed averaging about 50 feet/sec. To achieve this speed the reels 2 and 3 are rotated at speeds of approaching 1000 revs./minute.

By the term "high speed" as used in this specification and the claims appended hereto, we mean speeds substantially faster than those at which information can be read from the tape. With the fastest tape readers at present available the tape moves at speeds of only a few inches per second, and it is intended that the movement of the tape to the position at which reading shall commence may be at speeds greater than 20 feet per second in apparatus according to the invention.

In the embodiment described the tape is 1000 ft. in length and since the reels are rotated at the same angular velocity there will be an intermediate length of tape contained in the magazine 16. This is due to more tape being fed from the reel 2 than is being wound on to the reel 3 whilst the diameter of the tape on the reel 2 is greater than the diameter of the tape on the reel 3. When the diameter of the tape on the reel 3 becomes greater than that on the reel 2, then the intermediate tape will be withdrawn from the magazine 16. With 1000 feet of tape, the maximum length of tape in the magazine will be approximately 50 feet.

A sensing arrangement is provided for determining when a required section of the tape has reached the tape reader 15, and for causing the brake 13 and the electromagnetic brakes controlling the reels 2 and 3 to be operated. The photo-electric reader 14 and an electronic counter (not shown) are included in the sensing arrangement. Each section of the tape has information impressed thereon so that the section can be identified by the sensing arrangement. In this embodiment the punched tape is provided with an additional perforation channel in alignment with the photoelectric reader so that a pulse is supplied to the electronic counter as each section of the tape passes the reader 14. When a predetermined number of pulses, representative of the required section have been counted then the brakes will be operated.

The operation of the tape store will now be more fully described with particular reference to FIGS. 3 to 9.

When start contacts 40 (FIG. 7) are closed a relay RA/6 is energised by completion of a circuit from 100 volts D.C., through normally closed stop contacts 41, the normally open start contacts 40, and the relay RA/6 to earth. Operation of the relay RA/6 closes normally open contacts RA1 to RA5 and opens normally closed contacts RA6. Closing of the contacts RA1 energises the motor 27 by completing the circuit from A.C. to earth through contacts RA1, normally closed contacts RB2, and the motor 27, and also supplies A.C. to the tape reader 15. The electromagnet 24 is energised by completion of the circuit from 100 volts D.C. to earth through normally closed contacts RD4 and the contacts RA2, and this causes the roller 22 to be moved away from the drive roller 21. Contacts RA3 when they close prepare the circuits from 50 volts D.C. to earth through normally open contacts 43, contacts RA3, and then through either the normally closed contacts RC1 and electromagnet 42 which controls the brake 13, or through the relay RB/4, or through normally open contacts RC5, normally closed contacts RD5 and electromagnets 51 and 52 in parallel. The contacts RA4 are included in the circuit from the 100 volts D.C. to earth through normally open contacts RB3, contacts RA4 and the electromagnet 20. Electromagnet 20 is not, therefore, energised on closure of contacts RA4. The contacts RA5 are connected in the circuit from 100 volts D.C., through start and stop contacts 41 and 40, through normally open return-to-zero contacts 44, contacts RA5 relay RD/5 to earth. The closing of the contacts RA5 does not have any effect at this stage. The contacts RA6 are included in the circuit from 100 volts D.C. to earth through the normally closed contacts RD4, and RA6, normally open contacts RC4 and the electromagnet 10.

The tape storage device is maintained in the above condition, as shown tin FIGS. 1 and 3, until the required section of the tape has been identified by the sensing arrangement. This identification is effected by the counter which is arranged to close the contacts 43 when a predetermined number of pulses have been received from the photo-electric device 14. The counter, which may be of any known type, is not shown in the drawings. When the contacts 43 close, the electromagnet 42 is energised and the brake 13 is applied to stop the tape substantially instantaneously, for example within two inches. The closing of the contacts 43 also causes the relay RB/4 to be energised.

Figure 4:
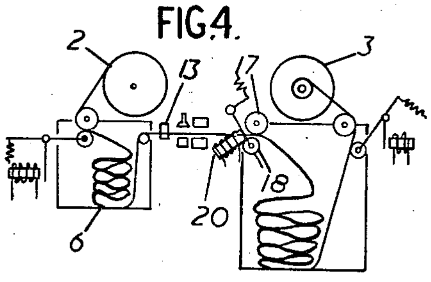

Energisation of the relay RB/4 causes contacts RB1, RB3 and RB4 to close and contacts RB2 to open. The closing of the contacts RB1 completes the circuit from 100 volts D.C. to earth through contacts RB1 and a slugged relay RC/5. Contacts RB2 when they open disconnect the A.C. supply from the motor 27, and the contacts RB3 when they close complete the circuit from 100 volts D.C. through contacts RB3, RA4, which were closed previously, and electromagnet 20 to earth, thus withdrawing the roller 18 from the drive roller 17. The contacts RB3 also complete the circuit from 100 volts D.C., through the contacts RB3, normally closed contacts RD3, and electromagnets 48 and 49 in parallel to earth. These latter electromagnets control the brakes 32 and 33 for stopping the reels 3 and 2 respectively. The closing of the contacts RB4 completes a holding circuit for the relay RB/4, this holding circuit being in parallel with the relay and consisting of a resistor 45, a capacitor 46 and a variable resistor 47. The time constant of the holding circuit is adjusted by varying the resistor 47 to be about 0.5 second delay. Thus when the brake 13 is operated, the roller 18 is moved away from the roller 17, the motor supply is disconnected, the brakes 32 and 33 are applied to bring the reels to rest, and tape is fed into the magazine 6, since the reels can not be stopped instantaneously. This condition is shown in FIG. 4.

Figure 5:
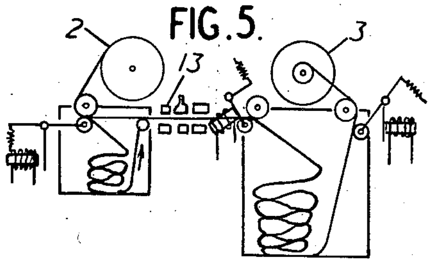

The relay RC/5 is slugged by the capacitor in parallel with it so that, although it is controlled by relay RB/4 it operates about 0.5 sec. after relay RB/4. This 0.5 second delay is allowed to give time for the tape reels 2 and 3 to come to rest. The operation of the relay RC/5 causes the contacts RC1 to open and de-energise the brake electromagnet 42, the motor contacts RC2 and RC3 to change over so that the motor will run in the reverse direction when it is next energised, the contacts RC4 to close, which has no effect since the contacts RA6 are open, and the contacts RC5 to close and energise the electromagnets 51 and 52 through the normally closed contact RD5. This condition is shown in FIG. 5.

The result of the energisation of the electromagnets 51 and 52 will be described with particular reference to FIGS. 8 and 9. The energisation of the electromagnet 51 causes a frame 53 to move anticlockwise about its pivot 54 against the action of a spring 55. Rigidly connected to the frame 53 is a sprocket plate 56 which is moved down by the movement of the frame 53 to a level below that of the sprocket pins 58 on the uppermost part of a sprocket wheel 57. The sprocket plate 56 and the sprocket wheel 57 are parts of the tape reader 15. Resiliently connected to the frame 53 through a light spring 59 is a bearing plate 60 which is caused by the movement of the frame 53 to press lightly down on the tape 1 to urge it into engagement with the sprocket pins 58. In general, however, the tape 1 will have been stopped in a position where the sprocket feed holes in it are not in register with the sprocket pins 58 so that the tape 1 and the bearing plate 60 will move a distance less than the distance moved by the frame 53 and the sprocket plate 56. In that event the end 61 of a member 62 associated with the bearing plate 60 will still be in a position to prevent anticlockwise movement of a frame 63 under the action of a spring 64, even though such movement is permitted by the downward movement of the tip 65 on the frame 53.

The energisation of the electromagnet 52 causes a member 66 to press the tape 1 lightly down on to a small roller 67 which is part of the tape reader 15 and which is revolving slowly but continuously as long as power is connected to the tape reader. The tape 1 is therefore fed slowly until a sprocket hole in it engages with a sprocket tooth 58, when the tape 1 and the bearing plate 60 both move down under the action of the spring 59 and the frame 63 is allowed to turn anticlockwise to change over contacts 68 and thus to break the circuit energising the electromagnet 52 and to cause the tape reader to start reading (see FIG. 7). The sprocket wheel 57 then feeds the tape 1 between successive reading operations, drawing on the supply of tape in the magazine 6.

It may alternatively be required to impart information to a selected section and in such an arrangement a perforator would be provided instead of the tape reader. If magnetic instead of punched tape were to be employed, then either record or playback heads or both would be used, and associated circuitry would be necessary.

After the tape reader has read out all the information required from the particular section, the equipment into which the information is being fed sends a signal to indicate it has received all the information it needs and this end of message signal causes the contact 44 (FIG. 7) to close to start the operation of returning the tape quickly to the initial condition with the tape on the reel 2.

The closing of the contact 44 energises the relay RD/5 which closes contacts RD1 and RD2, and opens contacts RD3, RD4 and RD5. Closing of the contacts RD1 connects the motor 27 to the A.C. supply in the reverse sense so that the reels 2 and 3 and the drive rollers 4, 17 and 21 are driven in the opposite direction to the FIG. 3 condition. The electromagnet 10 is energised when the contact RD2 are closed, since contacts RB3 are already closed, and this causes the roller 5 to be moved away from the drive roller 4. The opening of the contacts RD3 deenergises the brake electromagnets 48, 49, and the opening of the contacts RD4 de-energises the electromagnet 24 to cause the roller 22 to press against the drive roller 21. The opening of the contacts RD5 breaks the circuit through the electromagnet 51, so that the frame 53 moves back clockwise under the action of the spring 55. The tip 65 on the frame 53 also draws the frame 63 clockwise against the action of the spring 64, thereby permitting the member 62 to move back and the tape 1 and the sprocket plate 56 move clear of the sprocket pins 58. The clockwise movement of the frame 63 allows the contacts 68 to change back to the position shown in FIGS. 7 and 8, but the fact that contacts RD5 are open prevents the electromagnet 52 reenergising.

Figure 6:
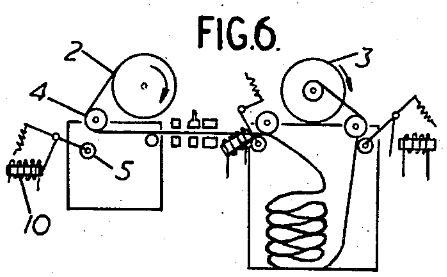

The condition of the device when the operations controlled by the relay RD/5 have been completed and the tape 1 is being returned to the reel 2 at high speed is shown in FIG. 6.

When sufficient tape has been fed onto the reel 2, then the stop contacts 41 are opened under control of the same counter which was used to find the desired section of the tape. In this case the counter counts back down to zero and opens contacts 41 when it reaches zero. The opening of the contacts 41 de-energises the relays RA/6 and RD/5. De-energisation of the relay RA/6 opens the contacts RA1 to RA5 and closes contacts RA6. The opening of the contacts RA1 and RA2 cuts off the supply voltage to the motor 27 and de-energises the electromagnet 24. The relay RB/4 is de-energised with a delay of 0.5 second after the contacts RA3 open, and as this relay RB/4 controls relay RC/5 there is a similar delay in de-energising the relay RC/5.

De-energisation of the relay RD/4 opens the contacts RD1 and RD2, and closes the contacts RD3 and RD4. The delay in de-energization of the relay RB/4 causes the brake electromagnets 48 and 49 to be operated during the delay period, i.e., until contacts RB3 open. The electromagnet 10 is energised during the delay period because contacts RA6 have closed and contacts RC4 have not opened. The opening of the contacts RB1 de-energises the relay RC/5 which closes the contacts RC1, opens the contacts RC4, and changes over the contacts RC2 and RC3. This de-energises the electromagnet 10 and stops the device in the rest condition to await the closing of the start contacts 40 to repeat the operation.

It is preferable for a safety device to be incorporated in the winding arrangement, so that if the counter fails for any reason the reels 2 and 3 will still be brought to rest before any damage is done to the tape. This safety device can conveniently be one which counts the number of revolutions of the reels and brings the whole system to rest if more than a particular number of revolutions are made in any particular direction.

Whilst in the particular embodiment described, the sensing arrangement detects the beginning of the required section and instantaneously stops the tape, it is to be understood that the required section could alternatively be detected by adjusting the sensing arrangement to detect part of the tape having a predetermined relationship with respect to the required section, such as for example a point on the tape several feet ahead of the commencement of the required section.

What we claim is:

1. A tape storage device comprising a storage tape, slow and high speed tape feeding devices, first and second tape winding reels, means for coupling said high speed device to said tape and to said reels to feed said tape from said first to said second reel at a speed substantially greater than the maximum speed at which the stored intelligence thereon can be reliably sensed, means for sensing a given section on said tape during operation of said high speed device, first braking means coupled to said sensing means for instantly stopping the motion of said tape at a point intermediate the said first and second reels upon detection of said given section, second braking means coupled to said sensing means for gradually stopping the motion of said first and second reels upon detection of said given section, first storage means associated with said first reel for storing tape due to the gradual stopping of said first reel and the instantaneous stopping of said intermediate point of said tape, second storage means associated with said second reel for storing tape due to differences in the diameters of the tape on said reels during operation of said high speed device, third means coupled to said sensing means for releasing said first braking means at a predetermined time following actuation of said second braking means, and means associated with said third means for coupling said slow speed device to said tape for feeding said tape stored in said first storage means for the purpose of sensing the intelligence stored thereon.

2. A tape storage device according to claim 1 wherein said tape is provided with uniformly spaced sprocket holes, and said slow speed device is provided with a corresponding sprocket wheel, and wherein said means for coupling said slow speed device includes means for slowly moving said tape relative to said sprocket wheel to permit smooth engagement between said sprocket wheel and said sprocket holes.

References Cited by the Examiner

UNITED STATES PATENTS

| | | | |
|---|---|---|---|
| 2,575,034 | 11/51 | Tyler et al. | |
| 2,688,049 | 8/54 | Pollard et al. | 235—61.1\ |
| 2,877,012 | 3/59 | Angel et al. | 226—9 X |
| 3,002,671 | 10/61 | Brumbach et al. | 226—176 |
| 3,032,284 | 5/62 | Uritus | 242—55.12 |

MALCOLM A. MORRISON, *Primary Examiner.*

CORNELIUS D. ANGEL, DARYL W. COOK, *Examiners.*